United States Patent
Horiuchi et al.

(10) Patent No.: US 9,087,631 B2
(45) Date of Patent: *Jul. 21, 2015

(54) PERMANENT MAGNET AND METHOD OF MANUFACTURING THE SAME, AND MOTOR AND POWER GENERATOR USING THE SAME

(75) Inventors: Yosuke Horiuchi, Chigasaki (JP); Shinya Sakurada, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,954

(22) Filed: May 19, 2011

(65) Prior Publication Data

US 2011/0278976 A1    Nov. 17, 2011

Related U.S. Application Data

(63) Continuation of application No. PCT/JP2009/006160, filed on Nov. 17, 2009.

(30) Foreign Application Priority Data

Nov. 19, 2008  (JP) ................ P2008-295432

(51) Int. Cl.
  *H01F 7/02*  (2006.01)
  *H01F 41/02* (2006.01)
  (Continued)

(52) U.S. Cl.
  CPC .............. *H01F 1/0557* (2013.01); *C22C 19/07* (2013.01); *C22C 33/0292* (2013.01); *C22F 1/10* (2013.01); *C22F 1/16* (2013.01); *H01F 41/0266* (2013.01);
  (Continued)

(58) Field of Classification Search
  CPC ................... H01F 1/055; H01F 1/0596
  See application file for complete search history.

(56) References Cited

U.S. PATENT DOCUMENTS

| 4,210,471 A | 7/1980 | Yoneyama et al. |
| 4,213,803 A | 7/1980 | Yoneyama et al. |

(Continued)

FOREIGN PATENT DOCUMENTS

| CH | 636 729 | 6/1983 |
| EP | 1 187 147 | 3/2002 |

(Continued)

OTHER PUBLICATIONS

Goplalan et al. Studies on structural transformation and magnetic properties in Sm2Co17 type alloy, J Mater Sci, 2001, vol. 36, p. 4117-4123.*

(Continued)

*Primary Examiner* — Jie Yang
*Assistant Examiner* — Xiaowei Su
(74) *Attorney, Agent, or Firm* — Oblon, McClelland, Maier & Neustadt, L.L.P.

(57) ABSTRACT

In an embodiment, a permanent magnet includes a composition represented by $R(Fe_p(Ti_sM_{1-s})_qCu_r(Co_{1-t}A_t)_{1-p-q-r})_z$ (R is at least one element selected from rare earth elements, M is at least one element selected from Zr and Hf, A is at least one element selected from Ni, V, Cr, Mn, Al, Ga, Nb, Ta and W, and p, q, r, s, t and z are numbers satisfying $0.3 \leq p \leq 0.6$, $0.01 \leq q \leq 0.1$, $0.01 \leq r \leq 0.15$, $0.2 \leq s \leq 0.8$, $0 \leq t \leq 0.2$, $6 \leq z \leq 9$ in an atomic ratio, respectively), and a structure composed mainly of a $Th_2Zn_{17}$ crystal phase and a $CaCu_5$ crystal phase.

12 Claims, 1 Drawing Sheet

(51) Int. Cl.
  *B22F 3/12* (2006.01)
  *B22F 3/24* (2006.01)
  *H01F 1/055* (2006.01)
  *C22C 19/07* (2006.01)
  *C22C 33/02* (2006.01)
  *C22F 1/10* (2006.01)
  *C22F 1/16* (2006.01)
  *H02K 1/27* (2006.01)
  *H02K 1/02* (2006.01)

(52) U.S. Cl.
  CPC ......... *H02K 1/2766* (2013.01); *C22C 2202/02* (2013.01); *H02K 1/02* (2013.01)

(56) References Cited

U.S. PATENT DOCUMENTS

| | | | | |
|---|---|---|---|---|
| 4,375,996 | A * | 3/1983 | Tawara et al. | 148/303 |
| 5,781,843 | A * | 7/1998 | Anderson et al. | 419/29 |
| 7,381,477 | B2 * | 6/2008 | Shipton et al. | 428/670 |
| 8,211,246 | B2 * | 7/2012 | Hagiwara et al. | 148/303 |
| 2002/0054825 | A1 | 5/2002 | Sukaki et al. | |
| 2006/0137767 | A1 * | 6/2006 | Yamamoto et al. | 148/302 |
| 2007/0051431 | A1 * | 3/2007 | Sakaki et al. | 148/105 |
| 2009/0261774 | A1 | 10/2009 | Yuuki et al. | |
| 2011/0241810 | A1 * | 10/2011 | Horiuchi et al. | 335/302 |
| 2012/0074804 | A1 * | 3/2012 | Horiuchi et al. | 310/152 |
| 2012/0075046 | A1 * | 3/2012 | Hagiwara et al. | 335/302 |

FOREIGN PATENT DOCUMENTS

| | | |
|---|---|---|
| EP | 2 048 772 | 4/2009 |
| GB | 2 021 147 | 11/1979 |
| JP | 52-096923 | 8/1977 |
| JP | 52-115000 | 9/1977 |
| JP | 53-137022 | 11/1978 |
| JP | 54-124822 | 9/1979 |
| JP | 57-196502 | 12/1982 |
| JP | 57-198228 | 12/1982 |
| JP | 59-143038 | 8/1984 |
| JP | 62-192568 | 8/1987 |
| JP | 62-260034 | 11/1987 |
| JP | 04-052244 | 2/1992 |
| JP | 06-140218 | 5/1994 |
| JP | 2002-083705 | 3/2002 |
| JP | 2008-029148 | 2/2008 |
| JP | 2008-043172 | 2/2008 |

OTHER PUBLICATIONS

Luo et al. Effects of the doping element on crystal structure and magnetic properties of Sm(Co, M)7 compounds (M=Si, Cu, Ti, Zr, and Hf), Intermetallics, 2005, vol. 13, p. 710-716.*
International Search Report issued Feb. 23, 2010 in PCT/JP09/006160 filed Feb. 10, 2010.

* cited by examiner

PERMANENT MAGNET AND METHOD OF MANUFACTURING THE SAME, AND MOTOR AND POWER GENERATOR USING THE SAME

CROSS-REFERENCE TO RELATED APPLICATIONS

This application is a continuation of prior International Application No. PCT/JP2009/006160, filed on Nov. 17, 2009 which is based upon and claims the benefit of priority from Japanese Patent Application No. 2008-295432, filed on Nov. 19, 2008; the entire contents of all of which are incorporated herein by reference.

FIELD

Embodiments described herein relate generally to a permanent magnet and a method of manufacturing the same, and to a motor and a power generator using the same.

BACKGROUND

To a motor of a hybrid electric vehicle (HEV), an electric vehicle (EV) or the like, Nd—Fe—B based magnets are applied mainly. Since a high heat resistance is required of such a use, (Nd, Dy)—Fe—B based magnets in which part of neodymium (Nd) is replaced by dysprosium (Dy) are used. In a full-scale propagation of motors for HEV and EV, a permanent magnet in which Dy being a rare element is not used is required. Meanwhile, it is known that Sm—Co based magnets have a superior heat resistance without using Dy. As the Sm—Co based permanent magnets, there are known $SmCo_5$ type magnets based on a binary system intermetallic compound of Sm and Co, and $Sm_2Co_{17}$ type magnets which have a two-phase separation structure of a $Th_2Zn_{17}$ crystal phase and a $CaCu_5$ crystal phase and has a magnet property by a magnetic coercive force exhibiting mechanism of a magnetic domain wall pinning type.

The $Sm_2Co_{17}$ type magnet is superior in a magnetic coercive force and a maximum magnetic energy product compared with the $SmCo_5$ type magnet, and has a superior heat resistance due to a high Curie temperature. Since the Sm—Co based magnet contains much Co, the Sm—Co based magnet is of high cost, and further a magnetization of the Sm—Co based magnet is smaller compared with that of the Nd—Fe—B based magnet. For an improvement of the magnetization of the $Sm_2Co_{17}$ type magnet, increasing a content of Fe in the $Sm_2Co_{17}$ type magnet is effective, and by increasing the Fe content, it is possible to reduce a cost of the $Sm_2Co_{17}$ type magnet. However, increasing the Fe content incurs a destabilization of a $TbCu_7$ crystal phase (high-temperature phase) being a precursor of the $Sm_2Co_{17}$ type magnet, and consequently, the two-phase separation structure of the $Th_2Zn_{17}$ crystal phase and the $CaCu_5$ crystal phase cannot be obtained.

DETAILED DESCRIPTION

Figure 1:
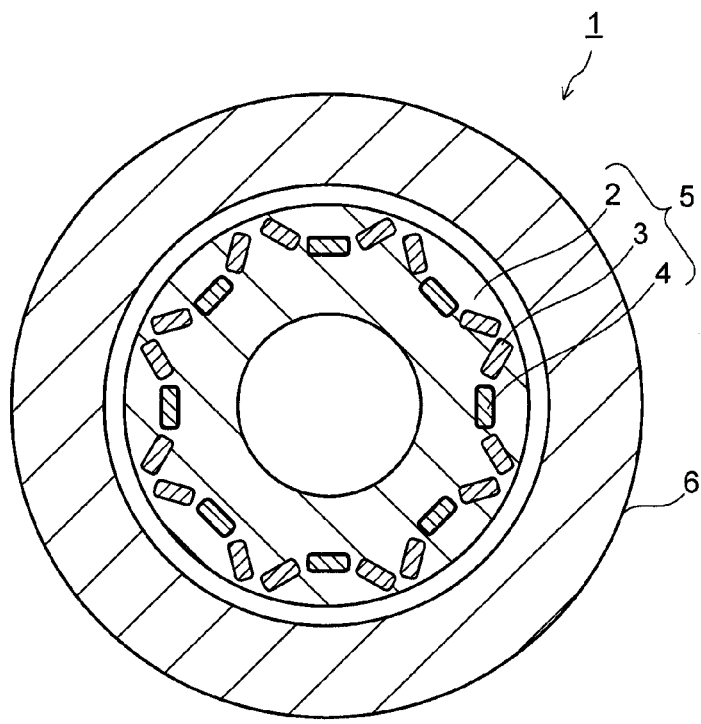
FIG. 1 is a diagram illustrating a variable magnetic flux motor according to an embodiment.

Embodiments described herein relate to provide a permanent magnet and a method of manufacturing the same in which an improvement of a magnetization and a cost reduction are made possible by heightening an Fe density of an Sm—Co based magnet superior in a heat resistance while maintaining a crystal structure which brings about a magnet property, and a permanent magnet motor and a power generator using the same.

A permanent magnet according to an embodiment includes a composition represented by a composition formula:

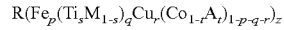

where, R is at least one element selected from rare earth elements, M is at least one element selected from Zr and Hf, A is at least one element selected from Ni, V, Cr, Mn, Al, Ga, Nb, Ta and W, and p, q, r, s, t and z are numbers satisfying $0.3 \leq p \leq 0.6$, $0.01 \leq q \leq 0.1$, $0.01 \leq r \leq 0.15$, $0.2 \leq s \leq 0.8$, $0 \leq t \leq 0.2$, $6 \leq z \leq 9$ in an atomic ratio, respectively, and a structure composed mainly of a $Th_2Zn_{17}$ crystal phase and a $CaCu_5$ crystal phase.

A method of manufacturing a permanent magnet according to an embodiment includes fabricating an alloy powder having a composition represented by a composition formula:

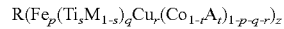

where, R is at least one element selected from rare earth elements, M is at least one element selected from Zr and Hf, A is at least one element selected from Ni, V, Cr, Mn, Al, Ga, Nb, Ta and W, and p, q, r, s, t and z are numbers satisfying $0.3 \leq p \leq 0.6$, $0.01 \leq q \leq 0.1$, $0.01 \leq r \leq 0.15$, $0.2 \leq s \leq 0.8$, $0 \leq t \leq 0.2$, $6 \leq z \leq 9$ in an atomic ratio, respectively, fabricating a pressed powder body by forming the alloy powder in a magnetic field, fabricating a sintered body by sintering the pressed powder body, performing a solution heat treatment to the sintered body at a temperature in a range of 1130 to 1230° C., and performing an aging heat treatment to the sintered body after the solution heat treatment.

A permanent magnet motor according to an embodiment includes the permanent magnet according to the embodiment. A power generator according to an embodiment includes the permanent magnet according to the embodiment.

According to a permanent magnet of an embodiment, it is possible to stably obtain a two-phase structure of a $Th_2Zn_{17}$ crystal phase and a $CaCu_5$ crystal phase by a composition containing high-density Fe. Therefore, it becomes possible to provide a permanent magnet superior in a magnetic property and a heat resistance at a low cost.

A permanent magnet of an embodiment will be described. The permanent magnet has a composition represented by a composition formula:

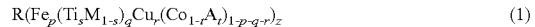 (1)

where, R is at least one element selected from rare earth elements, M is at least one element selected from Zr and Hf, A is at least one element selected from Ni, V, Cr, Mn, Al, Ga, Nb, Ta and W, and p, q, r, s, t and z are numbers satisfying $0.3 \leq p \leq 0.6$, $0.01 \leq q \leq 0.1$, $0.01 \leq r \leq 0.15$, $0.2 \leq s \leq 0.8$, $0 \leq t \leq 0.2$, $6 \leq z \leq 9$ in an atomic ratio, respectively.

The permanent magnet of this embodiment satisfies the composition of the formula (1), and in addition, has a structure composed mainly of a $Th_2Zn_{17}$ crystal phase and a $CaCu_5$ crystal phase. In other words, the permanent magnet of this embodiment realizes a two-phase separation structure of the $Th_2Zn_{17}$ crystal phase and the $CaCu_5$ crystal phase in a high Fe density composition by compounding Fe, Cu, Ti and an element M (at least one selected from Zr and Hf) into an R (for example, Sm)—Co based composition.

The R—Co based permanent magnet ($R_2Co_{17}$ type magnet) having the two-phase separation structure of the $Th_2Zn_{17}$ crystal phase (hereinafter, mentioned as a 2-17 phase) and the $CaCu_5$ crystal phase (hereinafter, mentioned as a 1-5 phase), whose precursor is a $TbCu_7$ crystal phase (hereinafter, mentioned as a 1-7 phase) being a high-temperature phase as described above, obtains a magnet property by a magnetic coercive force exhibiting mechanism of a magnetic domain wall pinning type as a result that an aging processing is performed to the precursor thereby to phase-separate the precursor into the 2-17 phase and the 1-5 phase.

In order to improve a magnetization of the $R_2Co_{17}$ type magnet, it is necessary to heighten a stability of the 1-7 phase by a high Fe density composition. With regard to such a point, composing elements such as titanium (Ti), zirconium (Zr), and hafnium (Hf) has a remarkable effect. If those elements replace a Co (Fe) site, replacement induces a reduction of the magnetization due to a fact that those elements themselves are nonmagnetic elements, but from a comprehensive standpoint, an improvement of the magnetization can be expected since an Fe/Co ratio can be shifted to a higher Fe density side. If Ti, Zr, and Hf replace a rare earth site, a reduction of the magnetization of the Co (Fe) site by the replacement does not occur, and thereby a further increase of the magnetization is expected. However, in this case, since a density of a rare earth element in a crystal is decreased, a reduction of a magnetic anisotropy is apprehended.

Which site Ti, Zr, and Hf occupy also strongly depends on a manufacturing process. For example, in a material in a nonequiblium state such as a quenched thin ribbon manufactured by spouting alloy molten metal to a rotating metal roll, a probability of occupying the rare earth site is high, but by performing a heat-treatment thereof at a high temperature, part can be sometimes dispersed in the Co (Fe) site. Further, a probability of occupying the rare earth site or the Co (Fe) site largely differs by Ti, Zr, and Hf, and Ti has a high probability of occupying the Co (Fe) site, and Zr and Hf has a high probability of occupying the rare earth site.

One of reasons for the above is that an atomic radius of Ti is close to that of Co (Fe) while atomic radiuses of Zr and Hf are larger than that of Ti and close to an atomic radius of the rare earth element. A change can sometimes occurs in an a-axis length or a c-axis length in a crystal structure, depending on which site Ti, Zr, and Hf replace and further depending on whether Ti, Zr, and Hf replace a dumbbell site or another site in the Co (Fe) site. Such a change in a lattice constant brings about a change in a crystal field, thereby influencing a 4f electron orbit of the rare earth element and largely changing the magnetic anisotropy.

As described above, the difference in sites occupied by Ti, Zr, and Hf, since largely changing the magnetization and the magnetic anisotropy, largely influences a magnetic property of the $R_2Co_{17}$ type magnet. In other words, if the site occupied by Ti, Zr, and Hf can be controlled by controlling a compound ratio of Ti, Zr, and Hf, a manufacturing process, or the like, it becomes possible to heighten both the magnetization and the magnetic anisotropy simultaneously, so that a comprehensive improvement of the magnetic property can become possible.

The R—Co based permanent magnet of this embodiment realizes a high magnet property by a composition having a higher Fe density than that of a conventional $R_2Co_{17}$ type magnet, by compounding Ti and an element M (at least one element selected from Zr and Hf) complexly. In other words, by compounding Ti and the element M (Zr, Hf) into the R—Co based composition complexly, and performing a heat treatment for obtaining the 1-7 phase at a lower temperature than conventionally done, for example, the 1-7 phase can be stabilized by the composition having the high Fe density.

By using the 1-7 phase of the high Fe density as a starting material and applying an aging treatment to the starting material under an appropriate condition, the two-phase separation structure of the 2-17 phase and the 1-5 phase which has a higher Fe density than the conventional R—Co based permanent magnet can be obtained. Further, by compounding Ti and the element M (Zr, Hf) complexly, a c/a ratio being a ratio of a lattice constant of the 1-7 phase rises compared with a case of a single addition. Thereby, a c/a ratio of the 2-17 phase after phase separation also rises, thereby improving a magnetic anisotropy, so that an equivalent magnetic coercive force can be obtained even in the 2-17 phase of a large crystal grain. This contributes to an improvement of a volume ratio of the 2-17 phase, and the magnetization is improved also thereby. As a result of the above, it becomes possible to realize an improvement of a magnet property and a cost reduction of the R—Co based permanent magnet superior in a heat resistance.

A reason that the magnetic property is improved based on the complex addition of Ti and the element M (Zr, Hf) closely relates to the above-described occupied site. In other words, Ti has a high probability of occupying the Co (Fe) site, while Zr and Hf have a high probability of occupying the rare earth site. Thus, even if a total amount of Ti, Zr, and Hf is increased, a reduction of the magnetization can be made smaller compared with a case of the single addition. Further, the complex addition of Ti and the element M (Zr, Hf) brings about a change in a dumbbell disposition in the 2-17 phase and has an effect of increasing the c/a ratio thereby.

The R—Co based permanent magnet of this embodiment has the composition represented by the aforementioned formula (1). In the formula (1), at least one element selected from the rare earth elements including Y is used as the element R. The element R brings about a large magnetic anisotropy to a magnet material, giving a high magnetic coercive force. If a content of the element R is small, a large amount of an α-Fe phase precipitates and a large magnetic coercive force cannot be obtained. If the content of the element R is excessive, a saturation magnetization is reduced significantly. The element R is compounded so that a value z indicating an atomic ratio of the element R in relation to a total amount of Fe, Co, Cu, Ti and the element M is in a rage of $6 \leq z \leq 9$. It is preferable that the value z is in a range of $7 \leq z \leq 9$, and it is further preferable that the value z is in a range of $7.5 \leq z \leq 8.5$.

As the element R, it is preferable to use at least one element selected from samarium (Sm), neodymium (Nd), and praseodymium (Pr), and it is desirable to use Sm. Sm is effective to heighten a performance, especially a magnetic coercive force, of a magnet material. In view of the above, it is preferable that 50 atomic % or more of a total amount of the element R is Sm, and it is further preferable that 70 atomic % or more of the total amount of the element R is Sm.

Ti is an element effective in improving a magnet performance, in particular, a magnetic anisotropy due to an increase of a c/a ratio. The element M is an element effective in improving a magnet performance similarly to Ti, and at least one element selected from Zr and Hf is used. Then, compounding Ti and the element M simultaneously enables exhibition of a large magnetic coercive force by a composition having a high Fe density. A total compound amount of Ti and the element M is, as a value q of the formula (1), in a range of $0.01 \leq q \leq 0.1$, in other words, is in a range of 1 to 10 atomic % of the total amount of Fe, Co, Cu, Ti, and the element M.

If the total compound amount of Ti and the element M exceeds 10 atomic % of the total amount of Fe, Co, Cu, Ti and the element M, a reduction of the magnetization becomes notable, and if the total compound amount thereof is less than 1 atomic %, an effect of heightening the Fe density cannot be obtained sufficiently. It is preferable that the value q indicating the total compound amount of Ti and the element M is in a range of $0.015 \leq q \leq 0.05$, and it is further preferable that the value q is in a range of $0.025 \leq q \leq 0.04$. Since Hf is more expensive compared with Zr among the element M, it is desirable that Hf, even if used, is used less than 20 atomic % of the total amount of the element M. In other words, it is preferable that the element M is Zr only, or 80 atomic % or more is Zr.

A ratio (a value s of the formula (1)) of Ti in relation to the total compound amount of Ti and the element M is in a range of $0.2 \leq s \leq 0.8$. If the value s is less than 0.2, an upgrade effect of the magnetic anisotropy by the increase of the c/a ratio or an improvement effect of the Fe density cannot be obtained sufficiently. If the value s exceeds 0.8, a reduction of the magnetization becomes notable. It is more preferable that the compound ratio of Ti, which is indicated by the value s, is in a range of $0.2 \leq s \leq 0.5$, and it is further preferable that the compound ratio of Ti is in a range of $0.3 \leq s \leq 0.5$.

Copper (Cu) is an element essential for exhibiting a high magnetic coercive force in an R—Co based permanent magnet. A compound ratio of Cu is, as a value r of the formula (1), in a range of $0.01 \leq r \leq 0.15$, that is, in a range of 1 to 15 atomic % of the total amount of Fe, Co, Cu, Ti and the element M. If the compound amount of Cu exceeds 15 atomic % of the total amount of Fe, Co, Cu, Ti and the element M, a reduction of the magnetization becomes notable, and if the compound amount thereof is less than 1 atomic %, obtaining a high magnetic coercive force becomes difficult. It is preferable that the value r is in a range of $0.02 \leq r \leq 0.1$, and it is further preferable that the value r is in a range of $0.03 \leq r \leq 0.08$.

Iron (Fe) is mainly in charge of a magnetization of a magnet material. By increasing a compound amount of Fe, a saturation magnetization of the magnet material can be heightened. However, an excessive compound amount of Fe leads to precipitation of the α-Fe phase or difficulty in obtaining the two-phase structure of the 2-17 phase and the 1-5 phase, and it is apprehended that the magnetic coercive force is reduced. In view of the above, the compound amount of Fe is, as a value p of the formula (1), in a range of $0.3 \leq p \leq 0.6$, that is, in a range of 30 to 60 atomic of the total amount of Fe, Co, Cu, Ti, and the element M. It is preferable that the value p indicating the compound amount of Fe is in a range of $0.3 \leq p \leq 0.5$, and it is further preferable that the value p is in a range of $0.35 \leq p \leq 0.48$.

Cobalt (Co) is in charge of a magnetization of a magnet material and is an important element for exhibiting a high magnetic coercive force. Further, if a large amount of Co is compounded, a Curie temperature is improved, so that a thermal stability of a magnet property can be heightened. If a compound amount of Co is small, such an effect becomes small. However, if Co is compounded excessively, the compound amount of Fe is relatively decreased, and the improvement effect of the magnetization based on the increase of the Fe density cannot be obtained. In view of the above, the compound amount of Co is set so that the compound amount of each element in relation to the total amount of Fe, Co, Cu, Ti, and the element M is in the above-described range, in particular, so that the compound amount of Fe becomes in the range of 30 to 60 atomic %.

Part of Co can be replaced by at least one element A selected from Ni, V, Cr, Mn, Al, Ga, Nb, Ta and W. Thereby, a magnet property such as a magnetic coercive force can be heightened. However, since an excessive replacement amount of Co by the element A might induce a reduction of the magnetization, the replacement amount by the element A is set to be equal to or less than 20 atomic % of the Co amount.

The R—Co based permanent magnet having the above-described composition has a fine structure in which the Cu-rich $CaCu_5$ phase (1-5 phase) and the Fe-rich $Th_2Zn_{17}$ crystal phase (2-17 phase) are two-phase separated, and has the magnetic property based on such a two-phase separation structure. The two-phase separation structure is composed mainly of the 2-17 phase and the 1-5 phase. It is desirable that the R—Co based permanent magnet of this embodiment is composed substantially of the 2-17 phase and the 1-5 phase in practice, except for an impurity phase such as an α-Fe phase.

Further, the R—Co based permanent magnet has a larger ratio (c/a ratio) of a lattice constant in a crystal structure compared with a conventional $Sm_2Co_{17}$ type magnet. Thereby, the R—Co based permanent magnet superior in a heat resistance is improved in terms of a magnetization or a magnetic anisotropy. The c/a ratio is calculated based on a value measured by an x-ray diffraction. More specifically, when a crystal face perpendicular to a direction of an easy magnetization axis is a face a, one of crystal faces parallel to the direction of the easy magnetization axis is a face b, an x-ray main diffraction angle of the face a is $2\theta_1$, and an x-ray main diffraction angle of the face b is $2\theta_2$, a lattice constant a is defined by $4/3^{1/2} \times d_1$, and a lattice constant c is defined by $2 \times d_2$.

Here, $d_1$ indicates $\lambda/(2 \sin(2\theta_1/2))$ and $d_2$ indicates $\lambda/(2 \sin(2\theta_2/2))$. A unit of $d_1$ and $d_2$ is angstrom, and 2 is 1.5418 angstrom. The R—Co based permanent magnet of this embodiment is, as will be described later, fabricated by sintering an alloy powder after formation in a magnetic field, for example. The direction of the easy magnetization axis of the permanent magnet is equivalent to a magnetic field application direction at a time of formation.

If the ratio (c/a), obtained as above, of the lattice constant a and the lattice constant c is equal to or more than 0.839, the magnetization or the magnetic anisotropy of the R—Co based permanent magnet can be heightened with good repeatability. In other words, increasing the c/a ratio of the 2-17 phase improves the magnetic anisotropy and increases the volume ratio of the 2-17 phase, so that the magnetization becomes larger. Therefore, it becomes possible to obtain an R—Co based permanent magnet having a good magnet property. It is preferable that the permanent magnet of this embodiment has a c/a ratio of equal to or more than 0.839. It is more preferable that the c/a ratio of the R—Co based permanent magnet is equal to or more than 0.842, and it is further preferable that the c/a ratio of the R—Co based permanent magnet is 0.845.

Next, a method of manufacturing the R—Co based permanent magnet of this embodiment will be explained. First, an alloy powder containing a predetermined amount of each element is fabricated. The alloy powders are mixed to fulfill the composition of the formula (1). The alloy powder is prepared by fabricating a flake-shaped alloy thin ribbon by a strip cast method, for example, and then grinding the flake-shaped thin ribbon. However, fabrication of the alloy powder is not limited to the above.

In the strip cast method, it is preferable to inject alloy molten metal to a chill roll rotating at a peripheral speed of 0.1 to 20 m/sec thereby to obtain a thin ribbon solidified to have a thickness of equal to or less than 1 mm continuously. If the peripheral speed of the chill roll is less than 0.1 m/sec, compositional variation easily occurs in the thin ribbon. If the peripheral speed of the chill roll exceeds 20 m/sec, a crystal grain is minimized to have a size of equal to or less than a single magnetic domain size and a good magnetic property becomes hard to be obtained. It is more preferable that the peripheral speed of the chill roll is in a range of 0.3 to 15 m/sec, and it is further preferable that the peripheral speed of the chill roll is in a range of 0.5 to 12 m/sec.

An alloy powder can be also prepared by casting molten metal which is made by arc-melting or high-frequency melting an alloy material, and then grinding an obtained alloy ingot. As other preparation methods of the alloy powder, there can be cited a mechanical alloying method, a mechanical grinding method, a gas atomizing method, a reduction-diffusion method, and so on. The alloy powder prepared as above or the alloy before grinding can be subjected to a heat treatment as necessary for homogenization. Grinding of the alloy is performed by using a jet mill, a ball mill, or the like. It is preferable that grinding of the alloy is performed in an inert gas atmosphere or in ethanol in order to prevent an oxidation of the alloy powder.

Next, the alloy powder is filled into a mold installed in a magnetic field made by an electromagnet or the like, and is pressure-formed while the magnetic field is applied, whereby a pressed powder body in which a crystal axis of the alloy powder is oriented is fabricated. The pressed powder body as above is sintered under a condition of a temperature of 1100 to 1300° C. for 0.5 to 15 hours, and a dense sintered body is obtained. Sintering is performed normally in a vacuum or in an inert gas atmosphere such as argon gas in order to prevent an oxidation or the like.

If a sintering temperature is less than 1100° C., a density of the sintered body is reduced, and if the sintering temperature exceeds 1300° C., Sm or the like in the powder vaporizes, and a good magnetic property becomes hard to be obtained. It is more preferable that the sintering temperature is from 1150 to 1250° C., and it is further preferable that the sintering temperature is from 1180 to 1230° C. If a sintering time is less than 0.5 hours, the density of the sintered body becomes uneven, and if the sintering time exceeds 15 hours, Sm or the like in the powder vaporizes and a good magnetic property becomes hard to be obtained. It is more preferable that the sintering time is from 1 to 10 hours and it is further preferable that the sintering time is from 1 to 4 hours.

Next, a solution heat treatment and an aging heat treatment are performed to the sintered body thereby to control the crystal structure. The solution heat treatment is performed at a temperature in a range of 1130 to 1230° C. in order to obtain the 1-7 phase being the precursor of the 2-17 phase and the 1-5 phase. It is preferable that a solution heat treatment time is in a range of 0.5 to 8 hours. It is preferable that, in order to phase-separate the 1-7 phase being the precursor into the 2-17 phase and the 1-5 phase, the aging heat treatment is performed by holding the sintered body after the solution heat treatment at a temperature in a range of 700 to 900° C. for 0.5 to 20 hours and thereafter slowly cooling to 400° C., followed by furnace cooling to a room temperature, for example. Control of the crystal structure is important for controlling the magnetic coercive force.

If a solution heat treatment temperature is less than 1130° C., a proportion of the 1-7 phase cannot be sufficiently heightened, and a good magnetic property cannot be obtained. If the solution heat treatment temperature exceeds 1230° C. also, the proportion of the 1-7 phase is decreased and a good magnetic property cannot be obtained. It is more preferable that the solution heat treatment temperature is in a range of 1150 to 1210° C., and it is further preferable that the solution heat treatment temperature is in a range of 1160° C. to 1190° C. Application of such a solution heat treatment temperature enables further effective obtaining of the high Fe density 1-7 phase.

If the solution heat treatment time is less than 0.5 hours, there is a possibility that a constitutional phase becomes uneven. If the solution heat treatment time exceeds 8 hours, Sm or the like in the sintered body vaporizes and a good magnetic property becomes hard to be obtained. It is more preferable that the solution heat treatment time is in a range of 1 to 8 hours, and it is further preferable that the solution heat treatment time is in a range of 1 to 4 hours. The solution heat treatment is normally performed in a vacuum or in an inert gas atmosphere such as argon gas in order to prevent an oxidation.

If an aging heat treatment temperature is less than 700° C. or exceeds 900° C., an even mixed phase of the 2-17 phase and the 1-5 phase cannot be obtained. It is more preferable that the aging heat treatment temperature is from 750 to 900° C., and it is further preferable that the aging heat treatment temperature is from 800 to 850° C. If an aging heat treatment time is less than 0.5 hours, phase separation from the 1-7 phase to the 2-17 phase and the 1-5 phase cannot be completed, and if the aging heat treatment time exceeds 15 hours, the magnetic property is reduced due to coarsening of the crystal grain or the like. It is more preferable that the aging heat treatment time is from 1 to 15 hours, and it is further preferable that the aging heat treatment time is from 5 to 10 hours. The aging heat treatment is performed in a vacuum or in an inert gas atmosphere such as argon gas in order to prevent an oxidation. Further, it is preferable that slow cooling after the aging heat treatment is performed at a cooling speed in a range of 0.5 to 5° C./min.

By applying the above-described method of manufacturing, it is possible to obtain a permanent magnet, more specifically a sintered magnet, with good repeatability, which has a structure having a high Fe density and a two-phase structure of a 2-17 phase and a 1-5 phase and in which a c/a ratio of the 2-17 phase is increased. The permanent magnet of this embodiment is not limited to the sintered magnet but can be a bond magnet. The bond magnet is fabricated by, for example, mixing a magnet material (alloy powder) whose crystal structure or the like is controlled with a binder component such as a resin-based binder or a metal binder and compress-molding the mixture into a desired magnet shape.

The permanent magnet of this embodiment is suitably used for a permanent magnet motor or a permanent magnet power generator. The motor or the power generator which uses the permanent magnet is superior in an efficiency compared with a conventional induction motor and power generator, contributing to a miniaturization and a noise reduction. Thus, the motor or the power generator which uses the permanent magnet is popular as a drive motor or a power generator of a variety of home electric motors, a railroad vehicle, a hybrid electric vehicle (HEV), an electric vehicle (EV), or the like. According to a motor or a power generator which includes the permanent magnet of this embodiment, a further high efficiency, a miniaturization, and a cost reduction can be realized. Further, the R—Co based permanent magnet, since being superior in a heat resistance, is suitable for a drive motor or a power generator of a railroad vehicle, an HEV, an EV, or the like. It should be noted that to the permanent magnet motor or power generator a variety of known constitutions are applied.

As concrete examples of the motor and power generator using the permanent magnet of this embodiment, there can be cited a variable magnetic flux motor and a variable magnetic flux generator. The permanent magnet of this embodiment is applicable to both a variable magnet and a stationary magnet of the variable magnetic flux motor and the variable magnetic flux generator. Application of the permanent magnet of this embodiment to at least one of the variable magnet and the stationary magnet promotes a high efficiency, a miniaturization, a cost reduction or the like of a variable magnetic flux drive system. To a constitution or a drive system of the variable magnetic flux motor, techniques disclosed in JP-A2008-029148 (KOKAI) and JP-A 2008-043172 (KOKAI) can be applied.

Figure 2:
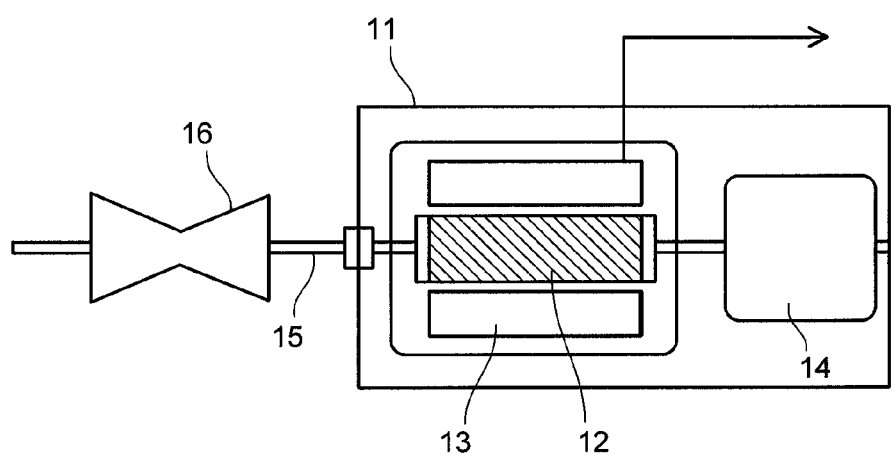
FIG. 2 is a diagram illustrating a variable magnetic flux generator according to the embodiment.

As illustrated in FIG. 1, a variable magnetic flux motor 1 includes a rotor 5 in which a stationary magnet 3 and a variable magnet 4 are disposed in an iron core 2, and a stator 6 which has a constitution similar to that of a conventional motor. As illustrated in FIG. 2, a variable magnetic flux generator 11 includes a rotor coil 12 having a stationary magnet and a variable magnet, a stator coil 13, and a brush 14. The variable magnetic flux generator 11 power-generation-operates by rotating a shaft 15 attached to the rotor coil 12 by means of a turbine 16.

Next, concrete examples of the permanent magnet according to the embodiment will be explained.

Examples 1 to 4

First, respective materials of high purity are blended so that a magnet composition becomes a composition presented in Table 1 and arc-melted in an Ar gas atmosphere, whereby an alloy ingot is fabricated, respectively. Next, a heat treatment is applied to each alloy ingot under a condition of 1170° C.×1 hour. Such alloy after having been heat-treated is coarse-ground and further fine-ground by a jet mill. After such a fine powder is each press-formed in a magnetic field thereby to form a pressed powder body, the pressed powder body is sintered in an Ar gas atmosphere under a condition of 1250° C.×1 hour and subsequently heat-treated under a condition of 1170° C.×1 hour, whereby a sintered body is fabricated.

An x-ray diffraction is performed to each obtained sintered body and it is confirmed that each sintered body is in a single phase state of a 1-7 phase. Such a sintered body is held at 850° C. for 10 hours in a vacuum and thereafter slow-cooled to 400° C. at a cooling speed of 1° C./min, whereby an aimed sintered magnet is respectively obtained. A structure of such a sintered magnet is TEM-observed and it is confirmed that each has a two-phase separation structure made up of a 2-17 phase and a 1-5 phase in practice. The sintered magnet as above is subjected to a later-described property evaluation.

Comparative Example 1

A sintered body is fabricated by using a material powder made by blending respective materials of high purity so that a magnet composition becomes a composition presented in Table 1, similarly to the example 1. The obtained sintered body is subjected to an x-ray diffraction and a diffraction peak indicating a generation of a 2-17 phase is notably observed. A magnet made up of such a sintered body is subjected to a later-described property evaluation.

Examples 5 to 8

Respective materials of high purity are blended so that a magnet composition becomes a composition presented in Table 1 and arc-melted in an Ar gas atmosphere, whereby an alloy ingot is fabricated. After each alloy ingot is charged into a nozzle made of quartz and molten by a high-frequency induction heating, alloy molten metal is injected to a chill roll rotating at a peripheral speed of 0.6 m/sec thereby to fabricate a thin ribbon which is solidified continuously. After being coarsely ground, the thin ribbon is finely ground by a jet mill. After such a fine powder is each press-formed in a magnetic field thereby to form a pressed powder body, the pressed powder body is sintered in an Ar gas atmosphere under a condition of 1250° C.×1 hour and subsequently heat-treated under a condition of 1190° C.×4 hours, whereby a sintered body is fabricated.

An x-ray diffraction is performed to each obtained sintered body and it is confirmed that each sintered body is in a single phase state of a 1-7 phase. Such a sintered body is held at 850° C. for 15 hours in a vacuum and thereafter slow-cooled to 400° C. at a cooling speed of 1° C./min, whereby an aimed sintered magnet is respectively obtained. A structure of such a sintered magnet is TEM-observed and it is confirmed that each has a two-phase separation structure made up of a 2-17 phase and a 1-5 phase in practice. The sintered magnet as above is subjected to a later-described property evaluation.

Comparative Example 2

A sintered body is fabricated by using a material powder made by blending respective materials of high purity so that a magnet composition becomes a composition presented in Table 1, similarly to the example 5. The obtained sintered body is subjected to an x-ray diffraction and a diffraction peak indicating a generation of a 2-17 phase is notably observed. A magnet up of such a sintered body is subjected to a later-described property evaluation.

Next, for each sintered magnet of the examples 1 to 8 and the comparative examples 1 and 2, a ratio (c/a ratio) of a lattice constant a and a lattice constant c is calculated by applying the aforementioned method (calculating method based on an x-ray diffraction result). Calculation results of the c/a ratios are presented in Table 1. Further, a residual magnetization and a magnetic coercive force of each sintered magnet are measured by a BH tracer. Measured results thereof are presented in Table 1.

TABLE 1

|  | Magnet Composition | c/a | Residual Magnetization Br [T] | Magnetic Coercive Force HcJ [kA/m] |
|---|---|---|---|---|
| E1* | $Sm(Fe_{0.40}(Ti_{0.2}Zr_{0.8})_{0.03}Cu_{0.06}Co_{0.51})_{7.7}$ | 0.842 | 1.22 | 255 |
| E2* | $Sm(Fe_{0.32}(Ti_{0.3}Zr_{0.7})_{0.04}Cu_{0.06}Co_{0.58})_{7.5}$ | 0.839 | 1.18 | 480 |
| E3* | $(Sm_{0.95}Ce_{0.05})(Fe_{0.36}(Ti_{0.5}Zr_{0.5})_{0.02}Cu_{0.08}Co_{0.54})_{8.1}$ | 0.845 | 1.23 | 340 |
| E4* | $(Sm_{0.95}Nd_{0.05})(Fe_{0.33}(Ti_{0.4}Zr_{0.6})_{0.03}Cu_{0.09}Co_{0.52})_{7.8}$ | 0.841 | 1.20 | 360 |
| E5* | $Sm(Fe_{0.40}(Ti_{0.2}Zr_{0.8})_{0.03}Cu_{0.06}Co_{0.51})_{7.7}$ | 0.848 | 1.24 | 300 |
| E6* | $Sm(Fe_{0.32}(Ti_{0.3}Zr_{0.7})_{0.04}Cu_{0.06}Co_{0.58})_{7.5}$ | 0.844 | 1.21 | 515 |
| E7* | $(Sm_{0.95}Ce_{0.05})(Fe_{0.36}(Ti_{0.5}Zr_{0.5})_{0.02}Cu_{0.08}Co_{0.54})_{8.1}$ | 0.848 | 1.25 | 330 |

TABLE 1-continued

| | | | Magnet Property | |
|---|---|---|---|---|
| | Magnet Composition | c/a | Residual Magnetization Br [T] | Magnetic Coercive Force HcJ [kA/m] |
| E8* | $(Sm_{0.95}Nd_{0.05})(Fe_{0.33}(Ti_{0.4}Zr_{0.6})_{0.03}Cu_{0.09}Co_{0.52})_{7.8}$ | 0.843 | 1.22 | 375 |
| CE1* | $Sm(Fe_{0.40}Zr_{0.03}Cu_{0.06}Co_{0.51})_{7.7}$ | 0.837 | 1.10 | 135 |
| CE2* | $Sm(Fe_{0.32}Ti_{0.04}Cu_{0.06}Co_{0.58})_{7.5}$ | 0.836 | 1.08 | 96 |

*E1 to E8 = Example 1 to Example 8;
*CE1 and CE2 = Comparative Example 1 and Comparative Example 2

As is obvious from Table 1, in each of the sintered magnets of the examples 1 to 8 in which Ti and Zr (element M) are complexly added, the c/a ratio is equal to or more than 0.839, and with regard to the magnet property, the magnetic coercive force exceeding 250 kA/m is obtained. In contrast, in the sintered magnets of the comparative examples 1,2 in which Ti or Zr is singly used, the c/a value is less than 0.839 and the magnetic coercive force is as low as less than 150 kA/m. With regard to the sintered body before the aging treatment being a middle stage of manufacturing of the sintered body, when a constitutional phase is evaluated by an x-ray diffraction, the single phase state of the 1-7 phase in general is observed in the example as described above, while the diffraction peak indicating the generation of the 2-17 phase is notably observed in the comparative example. This is considered to be one of reasons that a high magnetic coercive force cannot be obtained in the sintered body of the comparative example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent magnet, comprising:
a composition represented by a composition formula:

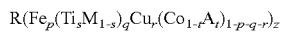

$R(Fe_p(Ti_sM_{1-s})_qCu_r(Co_{1-t}A_t)_{1-p-q-r})_z$ where, R is at least one element selected from rare earth elements,
M is at least one element selected from Zr and Hf,
A is at least one element selected from Ni, V, Cr, Mn, Al, Ga, Nb, Ta and W,
p is a number (atomic ratio) satisfying 0.3≤p≤0.6,
q is a number (atomic ratio) satisfying 0.01≤q≤0.1,
r is a number (atomic ratio) satisfying 0.01≤r≤0.15,
s is a number (atomic ratio) satisfying 0.2≤s≤0.5,
t is a number (atomic ratio) satisfying 0≤t≤0.2,
z is a number (atomic ratio) satisfying 6≤z≤9; and
a structure composed mainly of a $Th_2Zn_{17}$ crystal phase and a $CaCu_5$ crystal phase,
wherein a ratio (c/a) of a lattice constant c in relation to a lattice constant a in a crystal structure of the permanent magnet is equal to or more than 0.839, where a crystal face perpendicular to a direction of an easy magnetization axis is a face a, one of crystal faces parallel to the direction of the easy magnetization axis is a face b, an x-ray main diffraction angle of the face a is $2\theta_1$, an x-ray main diffraction angle of the face b is $2\theta_2$, the lattice constant a is defined by $4/3^{1/2} \times d1$, the lattice constant c is defined by $2 \times d_2$, $d_1$ [unit: angstrom] is $\lambda/(2 \sin(2\theta_1/2))$, d2 [unit: angstrom] is $\lambda/(2 \sin(2\theta_2/2))$, and $\lambda$ is 1.5418 angstrom.

2. The permanent magnet according to claim 1, wherein the element R is at least one selected from samarium (Sm), neodymium (Nd), and praseodymium (Pr).

3. The permanent magnet according to claim 2, wherein 50 atomic % or more of the element R is samarium (Sm).

4. The permanent magnet according to claim 3, wherein 80 atomic % or more of the element M is zirconium (Zr).

5. A permanent magnet motor, comprising:
the permanent magnet according to claim 1.

6. A power generator, comprising:
the permanent magnet according to claim 1.

7. The permanent magnet according to claim 1, wherein the atomic ratio s satisfies 0.3≤s≤0.5.

8. The permanent magnet according to claim 1, wherein the atomic ratio q satisfies 0.025≤q≤0.04.

9. A method of manufacturing a permanent magnet, comprising:
fabricating an alloy powder having a composition represented by a composition formula:

$R(Fe_p(Ti_sM_{1-s})_qCu_r(Co_{1-t}A_t)_{1-p-q-r})_z$ where, R is at least one element selected from rare earth elements,
M is at least one element selected from Zr and Hf,
A is at least one element selected from Ni, V, Cr, Mn, Al, Ga, Nb, Ta and W,
p is a number (atomic ratio) satisfying 0.3≤p≤0.6,
q is a number (atomic ratio) satisfying 0.01≤q≤0.1,
r is a number (atomic ratio) satisfying 0.01≤r≤0.15,
s is a number (atomic ratio) satisfying 0.2≤s≤0.5,
t is a number (atomic ratio) satisfying 0≤t≤0.2,
z is a number (atomic ratio) satisfying 6≤z≤9;
fabricating a pressed powder body by forming the alloy powder in a magnetic field;
fabricating a sintered body by sintering the pressed powder body;
performing a solution heat treatment to the sintered body at a temperature of from 1130 to 1230° C.;
performing an aging heat treatment to the sintered body after the solution heat treatment at a temperature of from 700 to 900° C. in a vacuum atmosphere; and
cooling slowly the sintered body after the aging heat treatment at a cooling speed in a range of 0.5 to 5°

C./min, to obtain the permanent magnet including a structure composed mainly of a $Th_2Zn_{17}$ crystal phase and a $CaCu_5$ crystal phase, wherein a ratio (c/a) of a lattice constant c in relation to a lattice constant a in a crystal structure of the permanent magnet is equal to or more than 0.839, where a crystal face perpendicular to a direction of an easy magnetization axis is a face a, one of crystal faces parallel to the direction of the easy magnetization axis is a face b, an x-ray main diffraction angle of the face a is $2\theta_1$, an x-ray main diffraction angle of the face b is $2\theta_2$, the lattice constant a is defined by $4/3^{1/2} \times d1$, the lattice constant c is defined by $2 \times d_2$, $d_1$ [unit: angstrom] is $\lambda/(2\sin(2\theta_1/2))$, d2 [unit: angstrom] is $\lambda/(2\sin(2\theta_2/2))$, and $\lambda$ is 1.5418 angstrom.

10. The manufacturing method according to claim 9, wherein the fabricating the alloy powder comprises:
fabricating a thin ribbon solidified to have a thickness of equal to or less than 1 mm continuously by injecting an alloy molten metal to a chill roll rotating at a peripheral speed of 0.1 to 20 m/sec; and
grinding the thin ribbon.

11. The manufacturing method according to claim 9, wherein the atomic ratio s satisfies $0.3 \leq s \leq 0.5$.

12. The manufacturing method according to claim 9, wherein the atomic ratio q satisfies $0.025 \leq q \leq 0.04$.

* * * * *